(12) United States Patent
Christiansen (10) Patent No.: US 8,352,088 B2
(45) Date of Patent: Jan. 8, 2013

(54) SYSTEM AND A METHOD FOR OPTIMISING AND PROVIDING POWER TO A CORE OF A VALVE

(75) Inventor: Tom N. Christiansen, Hørsholm (DK)

(73) Assignee: S-Rain Control A/S, Kvistgaard (DK)

( * ) Notice: Subject to any disclaimer, the term of this patent is extended or adjusted under 35 U.S.C. 154(b) by 1072 days.

(21) Appl. No.: 12/281,968

(22) PCT Filed: Feb. 27, 2007

(86) PCT No.: PCT/DK2007/000094
§ 371 (c)(1),
(2), (4) Date: Dec. 1, 2008

(87) PCT Pub. No.: WO2007/101436
PCT Pub. Date: Sep. 13, 2007

(65) Prior Publication Data
US 2009/0222140 A1  Sep. 3, 2009

Related U.S. Application Data

(60) Provisional application No. 60/779,857, filed on Mar. 7, 2006.

(30) Foreign Application Priority Data

Mar. 7, 2006  (EP) .................................... 06388015

(51) Int. Cl.
G05D 7/00  (2006.01)

(52) U.S. Cl. .............................. 700/282; 700/19; 239/69

(58) Field of Classification Search .................... 239/63, 239/67, 69; 700/3, 19, 22, 282, 284
See application file for complete search history.

(56) References Cited

U.S. PATENT DOCUMENTS

| 3,723,753 | A |   | 3/1973  | Davis |
|-----------|---|---|---------|-------|
| 4,004,612 | A |   | 1/1977  | Hummel, Jr. et al. |
| 4,007,458 | A |   | 2/1977  | Hollabaugh |
| 4,131,882 | A |   | 12/1978 | Hollabaugh et al. |
| 4,176,395 | A | * | 11/1979 | Evelyn-Veere et al. ........ 700/284 |
| 4,535,401 | A |   | 8/1985  | Penn |
| 5,293,551 | A | * | 3/1994  | Perkins et al. ................. 361/154 |

(Continued)

FOREIGN PATENT DOCUMENTS

EP          1467268       10/2004

*Primary Examiner* — Carlos Ortiz Rodriguez (74) *Attorney, Agent, or Firm* — Klein, O'Neill & Singh, LLP (57) ABSTRACT

A system for optimizing power to a valve core movable between first and second positions includes a controller providing a control signal to the core. With the core in the first position, the control signal has a hold voltage, and the controller measures a first self inductance. The control signal is provided with an inrush voltage to move the core to the second position, and with the hold voltage to retain it there. With the core in the second position, the controller measures a second self inductance, decreases the hold voltage, and measures a third self inductance representing the core's actual position. The controller determines, by comparing either the first or second self inductance with the third self inductance, whether the core is in the first or second position. If the core is in the second position, the decreased hold voltage is applied for retaining the core there.

29 Claims, 5 Drawing Sheets

U.S. PATENT DOCUMENTS

| | | |
|---|---|---|
| 5,570,030 A | 10/1996 | Wightman |
| 5,848,609 A | 12/1998 | Marchesseault et al. |
| 6,017,017 A | 1/2000 | Lutz et al. |
| 6,766,221 B1 | 7/2004 | Christiansen |
| 6,823,239 B2 | 11/2004 | Sieminski |
| 6,993,416 B2 | 1/2006 | Christiansen |
| 7,146,255 B2 | 12/2006 | Christiansen |
| 7,206,669 B2 | 4/2007 | Christiansen |
| 7,421,317 B2 | 9/2008 | Christiansen |
| 2002/0167777 A1 | 11/2002 | Parisi et al. |

* cited by examiner

SYSTEM AND A METHOD FOR OPTIMISING AND PROVIDING POWER TO A CORE OF A VALVE

CROSS-REFERENCE TO RELATED APPLICATION

This application is a national phase filing, under 35 U.S.C. §371(c), of International Application No. PCT/DK2007/000094, filed Feb. 27, 2007, the disclosure of which is incorporated herein by reference in its entirety. This application claims the benefit, under 35 U.S.C. Section 119(e), of U.S. Provisional Application No. 60/779,857, filed Mar. 7, 2006, the disclosure of which is incorporated herein by reference in its entirety.

FEDERALLY SPONSORED RESEARCH OR DEVELOPMENT

Not Applicable

BACKGROUND OF THE INVENTION

This invention relates generally to systems comprising at least one valve and controller unit, where the valve is powered in optimised ways.

Additionally the invention relates to methods for controlling valves, where the valves are powered in optimised ways.

DESCRIPTION OF THE RELATED ART

The most commonly known two-wire irrigation control systems, such as control systems described in U.S. Pat. Nos. 3,723,753, 4,004,612, 4,007,458, 4,131,882, 4,176,395, 4,535,401, 5,570,030, 5,848,609 and 6,823,239 and 6,993,416 to which reference is made and which are hereby incorporated in the present specification by reference, provide control of a number of remotely located irrigation or sprinkler valves from a central location by means of control signals encoded on to a single pair of power transmission lines linking, a central encoder and a number of remote decoders.

The two-wire irrigation control system according to U.S. Pat. No. 4,007,458 encodes and transmits an address of a specific remotely located irrigation valve and on/off signals onto an alternating current signal (AC) by clipping half portions of the signal to represent zero values.

Both two-wire irrigation control systems according to U.S. Pat. Nos. 4,007,458 and 4,176,395 communicate to remotely located irrigation valves or decoders by clipping of the power signals. Consequently, while performing a transmission on the power line, power to the remotely located irrigation valves or decoders is significantly reduced.

Furthermore the two-wire irrigation control systems according to U.S. Pat. Nos. 4,007,458 and 4,176,395 utilise sinusoidal signals for transmitting power to remotely located irrigation valves or decoders. Sinusoidal signals, being AC signals, generally need to be converted into DC in order to drive microprocessor electronic circuitry, adding to the total costs of the two-wire irrigation systems for the electronics incorporated in the remotely located irrigation valves or decoders.

An object of the present invention is to provide a system and method for controlling a plurality of controllable valves placed at specific localised areas, with limited power loss and optimised power consumption in said system while still ensuring proper operation (on/off), i.e. opening and closing and the movement of the piston and the core in the valves, of the valves.

A particular advantage of the present invention is utilisation of a power supply signal for the operation of the controllable valves hence performing an improved and limited power transmission while still ensuring proper operation (on/off) of the valves.

The above object, the above advantage, and the above feature together with numerous other objects, advantages, and features which will be evident from the below detailed description of the present invention are in accordance with the teaching of the present invention obtained by a first aspect, which is a system for optimising the power to a core of a valve in a position of the valve, the system comprising at least one valve and a controller unit, the controller unit having a pair of valve control outputs for providing a valve control signal, the at least one valve comprising a pair of valve control inputs, a solenoid, a core operable between a first and a second position, and a piston connected to the core.

the pair of valve control inputs connected to the solenoid and to the pair of valve control outputs.

the controller unit defining an inrush DC voltage level signal for forcing the core into the second position, the controller unit defining a hold DC voltage level signal for retaining the core in the second position, the controller unit, in the first position of the core, providing the valve control signal with the hold DC voltage level and measuring a first self inductance representing the core in the first position.

Since the solenoid is provided with the hold voltage level in the first position—and has not been provided with the inrush voltage just before—the core and the piston will not move. Accordingly, it is possible to measure the (first) inductance in the first position of the valve as discussed above. After measuring the first inductance, the controller unit, in the first position of the core, provides the valve control signal with the inrush DC voltage level signal for forcing the core from the first position to the second position, and subsequently the controller unit provides the valve control signal with the hold DC voltage level for retaining the core in the second position, and the controller unit measures, in the second position of the core, a second self inductance representing the core in the second position.

The controller unit, in the second position of the core, while providing the valve control signal with the hold DC voltage level, gradually decreases the hold DC voltage level and measures a third self inductance representing the actual physical position of the core.

The controller unit determines, on the basis of the first or second self inductance in comparison with the third self inductance, whether the core is in the first or second position.

On the basis of the comparison, the controller unit applies the gradually decreased hold DC voltage level for retaining the core in the second position provided that the core is in the second position, since in the situation above, the core stayed in the second position, the gradually decreased hold DC voltage level may be applied next time the core is to stay or be retained in the second position. Alternatively, the controller unit increases the gradually decreased hold DC voltage level and provides said valve control signal with said inrush DC voltage signal for forcing the core from the first position to the second position, and applies the increased gradually decreased hold DC voltage level for retaining the core in the second position, provided the core is in the first position.

Since in the situation above the core/piston did not stay in the second position, since the voltage was too low to hold it there whereby the piston and the core moved to the first position, the gradually decreased hold DC voltage level needs to be increased—by the controller unit—before this voltage (the hold DC voltage level) may be applied again for the valves core/piston to stay or be retained in the second position, of course only after the inrush voltage has been applied to the solenoid of the valve before.

In the system according to the first aspect, the valve is magnetically, electrically, hydraulically or pneumatically operated or combinations thereof.

In the system according to the first aspect the core of the valve is moved to the second position by applying the inrush DC voltage level signal followed by the hold DC voltage level to the pair of valve control inputs, and the core of the valve is moved to the first position by applying substantially a zero voltage signal to the pair of valve control inputs.

In the system according to the first aspect, the controller unit provides the inrush DC voltage level signal, the hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 25V to 45V such as ranges 27V to 43V or 30V to 40V or preferably the maximum voltage being 35V, defining a minimum voltage in the range of 0V to 5V such as ranges 0V to 3V or 0V to 1V or preferably the minimum voltage being 0V; and defining a controller unit output pulse width in the range of 100 μs to 0.1 s such as ranges 200 μs to 2 ms or 800 μs to 1.25 ms or preferably the control er unit output pulse width being 1 ms, the controller unit output pulse width defining a first part having the maximum voltage and a second part having the minimum voltage, and wherein the pulsed alternating DC signal constitutes the inrush DC voltage level signal by having the first part longer than or equal to the second part during a period in the range 10 ms to 1 s such as 30 ms to 100 ms and constitutes the DC hold voltage level by having the first part shorter than the second part.

The system according to the first aspect comprises between 20 to 40 valves and controller units.

The system according to the first aspect is a water irrigation system.

The above object, the above advantage, and the above feature together with numerous other objects, advantages, and features which will be evident from the below detailed description of the present invention are in accordance with the teaching of the present invention obtained by a second aspect, which is a system for providing power to a core of a valve to secure a position of the valve, the system comprising at least one valve and a controller unit, the controller unit having a pair of valve control outputs for providing a valve control signal, the at least one valve comprising a pair of valve control inputs a solenoid, a core operable between a first position and a second position, and a piston connected to the core, the pair of valve control inputs connected to the solenoid and to the pair of valve control outputs, the controller unit defining an inrush DC voltage level signal for forcing the core in the second position, the controller unit defining a hold DC voltage level signal with a high safety margin for securely retaining the core in the second position, the controller unit moving the core of the valve to the second position by applying the inrush DC voltage level signal followed by the hold DC voltage level signal with the high safety margin to the pair of valve control inputs, and the controller unit moving the core of the valve to the first position by applying substantially a zero voltage signal to the pair of valve control inputs.

In the system according to the second aspect, the valve is magnetically, electrically, hydraulically or pneumatically operated or combinations thereof.

In the system according to the second aspect, the controller unit provides the inrush DC voltage level signal, the hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 25V to 45V such as ranges 27V to 43V or 30V to 40V or preferably the maximum voltage being 35V; defining a minimum voltage in the range of 0V to 5V such as ranges 0V to 3V or 0V to 1V or preferably the minimum voltage being 0V; and defining a controller unit output pulse width in the range of 100 μs to 0.1 s such as ranges 200 μs to 2 ms or 800 μs to 1.25 ms or preferably the controller unit output pulse width being 1 ms, the controller unit output pulse width defining a first part having the maximum voltage and a second part having the minimum voltage, and wherein the pulsed alternating DC signal constitutes the inrush DC voltage level signal by having the first part longer than or equal to the second part during a period in the range 10 ms to 1 s such as 30 ms to 100 ms and constitutes the DC hold voltage level by having the first part shorter than the second part.

In the system according to the second aspect, the system comprises between 2 to 19 valves and controller units, alternatively between 3 to 5 valves and controller units.

In the system according to the second aspect, the system is a water irrigation system.

The above object, the above advantage, and the above feature together with numerous other objects, advantages, and features which will be evident from the below detailed description of the present invention are in accordance with the teaching of the present invention obtained by a third aspect of the present invention, which is a system for providing power to a core of a valve to secure a position of the valve with use of a constant energy, the system comprising at least one valve and a controller unit, the controller unit having a pair of valve control outputs for providing a valve control signal, the at least one valve comprising a pair of valve control inputs, a solenoid, a core operable between a first and a second position and a piston connected to the core, the pair of valve control inputs connected to the solenoid and to the pair of valve control outputs, the controller unit defining an inrush DC voltage level signal for forcing the core in the second position, the controller unit defining a hold DC voltage level signal for securely retaining the core in the second position, the controller unit defining a resistance for the solenoid, the controller unit defining a constant energy level for the hold DC voltage level signal, the constant energy level defined independent of the resistance for the solenoid, the controller unit moving the core of the valve to the second position by applying the inrush DC voltage level signal followed by the hold DC voltage level signal adjusted to match the constant energy level to the pair of valve control inputs, and the controller unit moving the core of the valve to the first position applying substantially a zero voltage signal to the pair of valve control inputs.

In the system according to the third aspect, the valve is magnetically, electrically, hydraulically or pneumatically operated or combinations thereof.

In the system according to the third aspect, the controller unit provides the inrush DC voltage level signal, the hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 251V to 45V such as ranges 27V to 43V or 30V to 40V or preferably the maximum voltage being 35V; defining a minimum voltage in the range of 0V to 5V such as ranges 0V to 3V or 0V to 1V or preferably the minimum voltage being 0V; and defining a controller unit output pulse width in the range of 100 μs to 0.1 s such as ranges 200 μs to 2 ms or 800 μs to 1.25 ms or preferably the controller unit output pulse width being 1 ms, the controller unit output pulse width defining a first part having the maximum voltage and a second part having the minimum voltage, and wherein the pulsed alternating DC signal constitutes the inrush DC voltage level signal by having the first part longer than or equal to the second part during a period in the range 10 ms to 1 s such as 30 ms to 100 ms and constitutes the DC hold voltage level by having the first part shorter than the second part.

In the system according to the third aspect, the system comprises between 2 to 19 valves and controller units, alternatively between 3 to 5 valves and controller units.

In the system according to the third aspect the system is a water irrigation system.

The above object, the above advantage, and the above feature together with numerous other objects, advantages, and features which will be evident from the below detailed description of the present invention are in accordance with the teaching of the present invention obtained by is a fourth aspect of the present invention obtained by a method for optimising the power to a core of a valve in a position, the method being controlled by a controller unit and comprising the steps of:

providing a valve control signal from the controller unit having a pair of valve control outputs, providing the valve comprising a pair of valve control inputs, a solenoid, the core operable between a first and a second position, and a piston connected to the core. connecting the pair of valve control inputs to the solenoid and to the pair of valve control outputs, defining by the controller unit an inrush DC voltage level signal for forcing the core in the second position, defining by the controller unlit a hold DC voltage level signal for retaining the core in the second position, providing by the controller unit, in the first position of the core, the valve control signal with the hold DC voltage level and measuring a first self inductance representing the core in the first positions, providing by the controller unit, in the first position of the core, the valve control signal with the inrush DC voltage level signal for forcing the core from the first position to the second position, and subsequently providing by the controller unfit the valve control signal with the hold DC voltage level for retaining the core in the second position and measuring by the controller unit, in the second position of the core, a second self inductance representing the core in the second position, while providing by the controller unit, in the second position of the core, the valve control signal with the hold DC voltage level gradually decreasing by the controller unit the hold DC voltage level and measuring by the controller unit a third self inductance representing the actual physical position of the core, determining by the controller unit on basis of the first or second self inductance in comparison with the third self inductance whether the core is in the first or second position, applying on the basis of the comparison the gradually decreased hold DC voltage level by the controller unit for retaining the core in the second position provided the core is in the second position, or alternatively increasing by the controller unit the gradually decreased hold DC voltage level, providing said valve control signal with said inrush DC voltage level for forcing the core from the first position to the second position and applying by the controller unit the increased gradually decreased hold DC voltage level for retaining the core in the second position provided the core is in the first position.

In the method according to the fourth aspect, the valve is magnetically, electrically, hydraulically or pneumatically operated or combinations thereof.

In the method according to the fourth aspect, the core of the valve is moved to the second position by applying the inrush DC voltage level signal followed by the hold DC voltage level to the pair of valve control inputs and moved to the first position by applying substantially a zero voltage signal to the pair of valve control inputs.

In the method according to the fourth aspect, the controller unit provides the inrush DC voltage level signal, the hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 25V to 45V such as ranges 27V to 43V or 30V to 40V or preferably the maximum voltage being 3V; defining a minimum voltage in the range of 0V to 5V such as ranges 0V to 3V or 0V to 1V or preferably the minimum voltage being 0V; and defining a controller unit output pulse width in the range of 100 μs to 0.1 s such as ranges 200 μs to 2 ms or 800 μs to 1.25 ms or preferably the controller unit output pulse width being 1 ms, the controller unit output pulse width defining a first part having the maximum voltage and a second part having the minimum voltage, and wherein the pulsed alternating DC signal constitutes the inrush DC voltage level signal by, having the first part longer than or equal to the second part during a period in the range 10 ms to 1 s such as 30 ms to 100 ms and constitutes the DC hold voltage level by having the first part shorter than the second part.

In the method according to the fourth aspect, the method comprises between 20 to 40 valves and controller units.

In the method according to the fourth aspect the method is implemented in a water irrigation system.

The above object, the above advantage, and the above feature together with numerous other objects, advantages, and features which will be evident from the below detailed description of the present invention are in accordance with the teaching of the present invention obtained by a fifth aspect, which is a method for providing power to a core of a valve to secure a position of the valve, the method being controlled by a controller unit and comprising the steps of:

providing a valve control signal from the controller unit having a pair of valve control outputs, providing the valve comprising a pair of valve control inputs, a solenoid, the core operable between a first and a second position, and a piston connected to the core, connecting the pair of valve control inputs to the solenoid and to the pair of valve control outputs, defining by the controller unit an inrush DC voltage level signal for forcing the core in the second position, defining by the controller unit a hold DC voltage level signal with a high safety margin for securely retaining the core in the second position, moving the core of the valve into the second position by the controller unit by applying the inrush DC voltage level signal followed by the hold DC voltage level signal with the high safety margin to the pair of valve control inputs, and moving the core of the valve to the first position by the controller unit the valve by applying substantially a zero voltage signal to the pair of valve control inputs.

In the method according to the fifth aspect, the valve is magnetically, electrically, hydraulically or pneumatically operated or combinations thereof.

In the method according to the fifth aspect, the controller unit provides the inrush DC voltage level signal, the hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 25V to 45V such as ranges 27V to 43V or 30V to 40V or preferably the maximum voltage being 35V; defining a minimum voltage in the range of 0V to 5V such as ranges 0V to 3V or 0V to 1V or preferably the minimum voltage being 0V; and defining a controller unit output pulse width in the range of 100 µs to 0.1 s such as ranges 200 µs to 2 ms or 800 µs to 1.25 ms or preferably the controller unit output pulse width being 1 ms, the controller unit output pulse width defining a first part having the maximum voltage and a second part having the minimum voltage, and wherein the pulsed alternating DC signal constitutes the inrush DC voltage level signal by having the first part longer than or equal to the second part during a period in the range 10 ms to 1 s such as 30 ms to 100 ms and constitutes the DC hold voltage level by having the first part shorter than the second part.

In the method according to the fifth aspect, the method comprises between 2 to 19 valves and controller units, alternatively the method comprising between 3 to 5 valves and controller units.

In the method according to the fifth aspect the method is implemented in a water irrigation system.

The above object, the above advantage, and the above feature together with numerous other objects, advantages, and features which will be evident from the below detailed description of the present invention are in accordance with the teaching of the present invention obtained by a sixth aspect of the present invention obtained by a method for providing power to a core of a valve to secure a position of the valve with use of a constant energy, the method being controlled by a controller unit and comprising the steps of:

providing a valve control signal from the controller unit having a pair of valve control outputs, providing the valve comprising a pair of valve control inputs a solenoid, the core operable between a first and a second position, and a piston connected to the core, connecting the pair of valve control inputs to the solenoid and to the pair of valve control outputs, defining by the controller unit an inrush DC voltage level signal for forcing the core in the second position, defining by the controller unit a hold DC voltage level signal for securely retaining the core in the second position, defining by the controller unit a resistance for the solenoid, defining by the controller unit a constant energy level for the hold DC voltage level signal, the constant energy level defined independent of the resistance for the solenoid, adjusting by the controller unit the hold DC voltage level signal to match the constant energy level, moving the core of the valve to the second position by the controller unit by applying the inrush DC voltage level signal followed by the adjusted hold DC voltage level signal to the pair of valve control inputs, and moving the core of the valve into the first position by the controller unit by applying substantially a zero voltage signal to the pair of valve control inputs.

In the method according to the sixth aspect, the valve is magnetically, electrically, hydraulically or pneumatically operated or combinations thereof.

In the method according to the sixth aspect, the controller unit provides the inrush DC voltage level signal, the adjusted hold DC voltage level and the zero voltage signal to the valve by supplying from the pair of valve control outputs a DC control signal or a pulsed alternating DC control signal to the pair of valve control inputs, the pulsed alternating DC signal defining a maximum voltage in the range of 25V to 45V such as ranges 27V to 43V or 30V to 40V or preferably the maximum voltage being 35V defining a minimum voltage in the range of 0V to 5V such as ranges 0V to 3V or 0V to 1V or preferably the minimum voltage being 0V; and defining a controller unit output pulse width in the range of 100 µs to 0.1 s such as ranges 200 µs to 2 ms or 800 µs to 1.25 ms or preferably the controller unit output pulse width being 1 ms, the controller unit output pulse width defining a first part having the maximum voltage and a second part having the minimum voltage, and wherein the pulsed alternating DC signal constitutes the inrush DC voltage level signal by having the first part longer than or equal to the second part during a period in the range 10 ms to 1 s such as 30 ms to 100 ms and constitutes the DC hold voltage level by having the first part shorter than the second part.

In the method according to the sixth aspect, the method comprises between 2 to 19 valves and controller units.

In the method according to the sixth aspect the method comprises between 3 to 5 valves and controller units.

The method according to the sixth aspect is implemented in a water irrigation system.

In the following, in the text relating to the drawings, in particular for FIGS. 1 to 5, the invention is explained in the context of an irrigation control system i.e. a two-wire irrigation control system applying a controllable irrigation valve controlled by a line decoder.

The invention, however, may be applied in any industrial application (e.g. in a power plant, in a plant on a ship, in a manufacturing plant, etc) i.e. a system or in a method in which a valve is applied to control fluids or forces e.g. water, oil, air, etc in hydraulic and or pneumatic applications.

Moreover, the valve may be applied to move and retain loads, e.g. in or into a vertical, a horizontal direction or combinations thereof. This is possible, for example by connecting the load to the movable piston of the valve.

The invention applies equally well to a normally closed and a normally open valve.

The term controllable irrigation valve thus may also be understood as a valve in general.

Accordingly, the line decoder may be replaced by a Programmable Logic Controller, a personal computer a personal computer applied in an industrial application or any other electronic device able to control the valve. These devices/units are in common denoted "controller unit".

E.g. the Programmable Logic Controller could control sub-modules which—close to the valve and on-site—each controls the core (connected to the piston) of the valve between a first and a second position and vice versa, and where the Programmable Logic Controller is also able, by means of the valve, to securely retain the first and the second position e.g. for a load.

Throughout the drawings, the same reference numerals indicate identical elements or is components. In the present specification, components or elements identical to components or elements, respectively, described previously with reference to a preceding figure are designated by the same reference numerals, and components or elements differing from previously described components or elements, respectively however serving the same overall purpose, are designated by the same integer as the previously described component or element, with, however, an added marking for identifying the structural difference from the previously described component or element.

DETAILED DESCRIPTION OF THE PRESENT INVENTION

Figure 1:
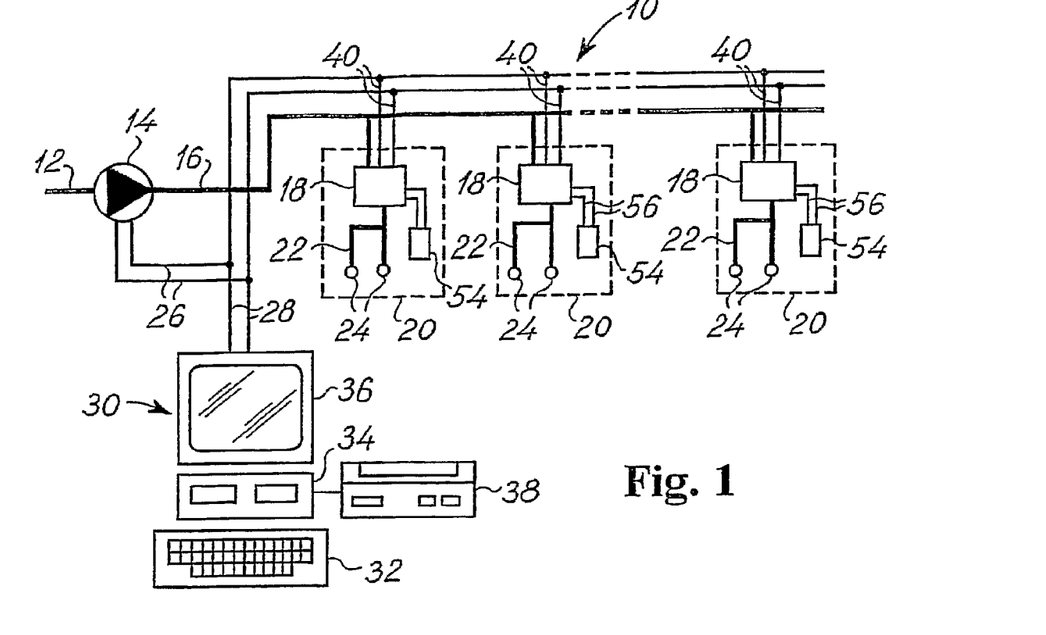
FIG. 1 shows a schematic overview of the two-wire controlling and monitoring system according to the preferred embodiment of the present invention.

The two-wire controlling and monitoring system designated by numeral 10 in its entirety and shown in FIG. 1, provides irrigation of localised areas e.g. a golf course having certain areas needing a particular amount of irrigation and others a smaller amount of irrigation parks having tree sections, lawns or flower beds all needing particular amounts of irrigation, greenhouse production lines having a series of production steps for plants flowers or vegetables all needing a particular amount of irrigation or farming fields having a variety of produce needing a variety of amounts of irrigation.

The two-wire controlling and monitoring system 10 has an inlet connection 12 supplying water from a general household water pump station or a water tank to a pump 14. The pump 14 is mechanically, pneumatically, hydraulically, electrically or magnetically driven or driven by combinations thereof and provides a water pressure on a water pipeline 16 enabling the water pipeline 16 to supply water to a plurality of localised irrigation control units 18 positioned at a series of localised areas of soil 20.

The water pipeline 16 may be constructed from metal pipes produced in materials such as iron, steel, copper, aluminum, silver, gold or any alloys thereof and/or plastic pipes produced in materials such as PVC, PP or PE or any combinations thereof.

The localised irrigation control units 18 are positioned at the series of localised areas of soil 20 and provide irrigation to specific areas of each of the localised areas of soil 20 through a is plurality of local pipelines 22 possibly mounted with sprinkling gadgets 24. The localised irrigation control units 18 utilise connections 40, and the pump 14 utilises connections 26 to communicate through a two-wire cable 28 interconnecting a controller and power supply unit 30 with the plurality of localised irrigation control units 18 and the pump 14. The controller and power supply unit 30 transmits power and schedules of instructions to the plurality of localised irrigation control units 18.

The controller and power supply unit 30 comprises a keyboard 32 for a user to communicate schedules of instructions i.e. controlling timing of irrigation and position of irrigation to be stored and executed by a computer 34. The controller and power supply unit 30 further comprises a monitor 36 for displaying the operation of the two-wire controlling and monitoring system 10 and a printer 38 for printing out information from the computer 34. The computer 34 may include an internal or external modem through which remote monitoring and controlling of the computer 34 is achieved and thereby remote monitoring and controlling of the controller and power supply unit 30. The computer 34 may further have access to internet facilities which similarly provides the possibility for remotely monitoring and controlling of the computer 34 and thereby the controller and power supply unit 30. Additionally, a series of computers for example operating irrigation monitoring and controlling systems like the computer 34 may be monitored and controlled from a central unit located at any position world-wide hooked up to the internet or connecting to the series of computers through use of modems.

Figure 2:
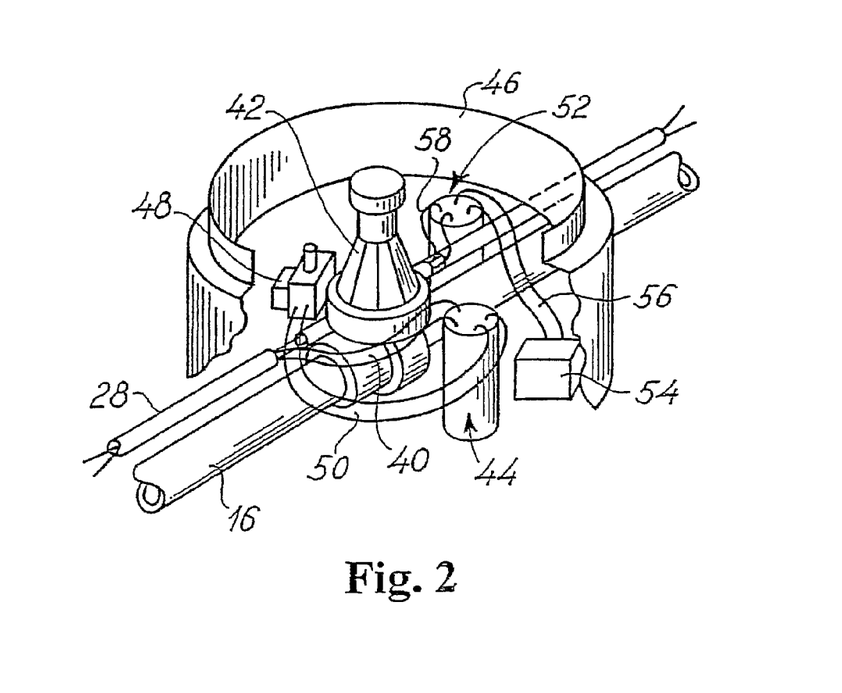
FIG. 2 shows in perspective a localised irrigation control unit according to the preferred embodiment of the present invention and interconnecting a two-wile cable and a controllable irrigation valve in communication with a water pipeline, and the localised irrigation control unit further being connected to a field sensor.

The localised irrigation control units 18 are situated in a housing or cabinet 46, shovel in FIG. 2, made of a wear resistant material such as metals like aluminum or steel or plastics like PVC, PP or PE. The housing 46 protects the localised irrigation control units 18 from any hostile environment the housing is positioned in.

Each of the localised irrigation control units 18, as shown in FIG. 2, may comprise a controllable irrigation valve 42 controlling release of water from the water pipeline 16 and a line decoder 44 transmitting the necessary schedules of instructions to the controllable irrigation valve 42.

The controllable irrigation valve 42 may be magnetically, electrically, hydraulically or pneumatically operated or combinations thereof; however, according to the presently preferred embodiment of the invention, the controllable irrigation valve 42 is electrically operated through connectors placed in a connector box 48 in the housing 46. The connector box 48 comprises a solenoid, which controls the valve between two positions: a first and a second position. The first position of the valve may be the closed valve and the second position of the valve may be the open valve. These positions may be interchanged, i.e. the first position of the valve may be the opened valve and the second position of the valve may be the closed valve. The words "open" and "closed" refer to which position or end position the core of the valve moves the piston—which is connected to the core—into. Variations of current applied to the solenoid causes the induction of magnetic fields, which subsequently activate the valve.

Figure 5:
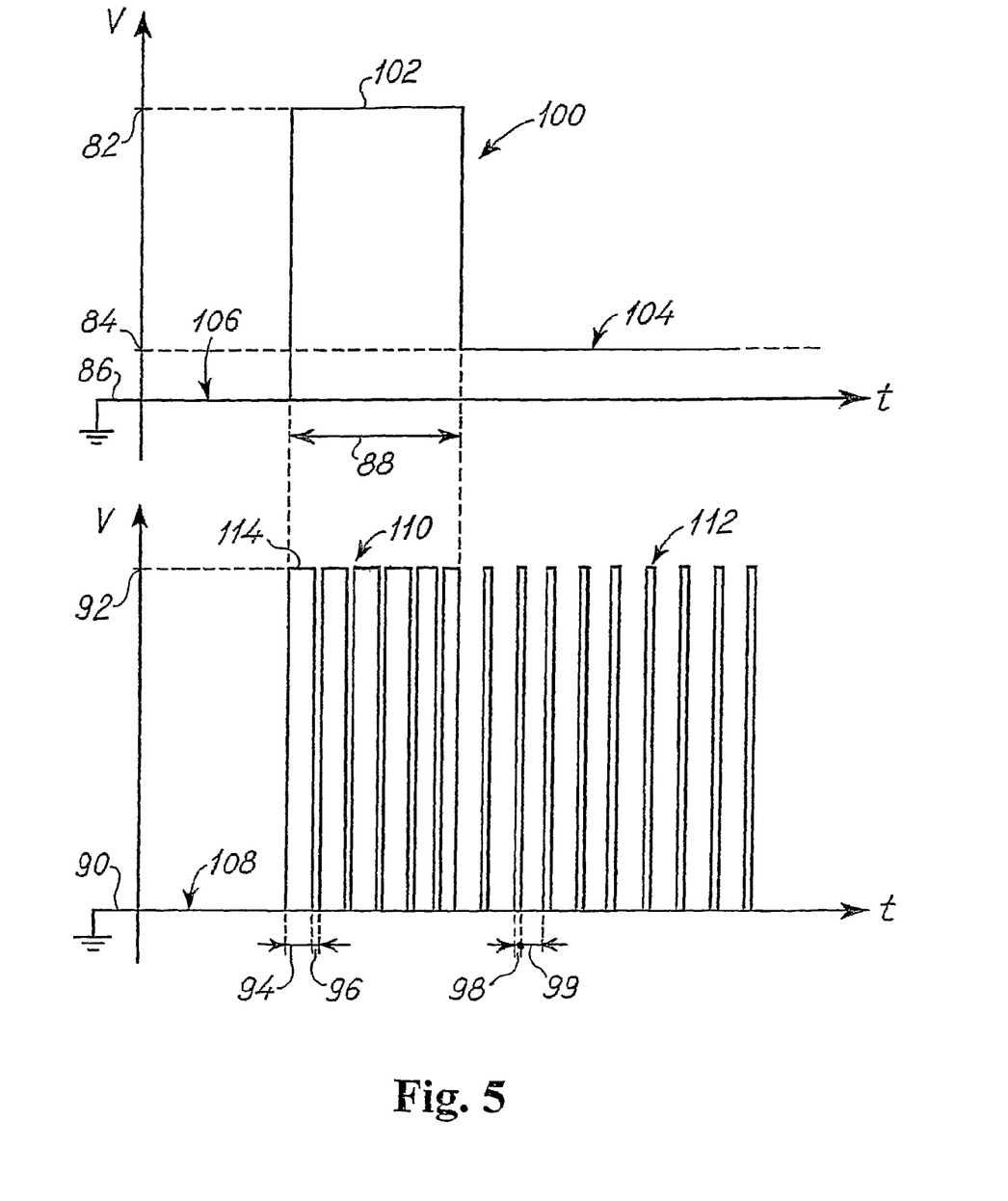
FIG. 5 shows a control voltage signal versus time provided by a line decoder in one of the localised irrigation control units to one of the controllable irrigation valves.

The line decoder 44 receives transmissions of schedules of instructions from the controller and power supply unit 30 through the two-wire cable 28. A pair of control and power inputs 40 connects the line decoder 44 to the two-wire cable 28. A pair of valve control outputs 50 connects the connector box 48 to the line decoder 44. The line decoder 44 applies control signals 100 to the connector box 48 through the pair of valve control outputs 50, which control signals 100, described in further detail below with reference to FIG. 5, are further communicated by the connector box 48 to the controllable irrigation valve 42. Alternatively the line decoder 44 may receive start instructions through radio transmissions produced by a mobile handhold mark sender providing the opportunity to initiate irrigation at specific localised areas regardless of schedules of instructions. This enables manual control of the controllable irrigation valves 42.

The localised irrigation control unit 18 further comprises a sensor decoder 52 as shown in FIGS. 1 and 2, recording a specific irrigation parameter from a field sensor 54 through a pair of sensor outputs 56 and providing a conversion of the specific irrigation parameter measured by the field sensor 54 to a binary number and additionally performing a transmission of the binary number to the controller and power supply unit 30. The sensor decoder 52 is connected to the two-wire cable 28 through a pair of control and power inputs 58. The specific irrigation parameters may be soil or air temperature, soil or air humidity, water pressure in the water pipeline 16, water flow in the water pipeline 16 or water flow through one of the controllable irrigation valves 42. Furthermore the specific irrigation parameters may be mechanical movement, mechanical strain or magnetic fields which may be utilised for the determination of the functionality or operation of the controllable irrigation valves 42.

Figure 3:
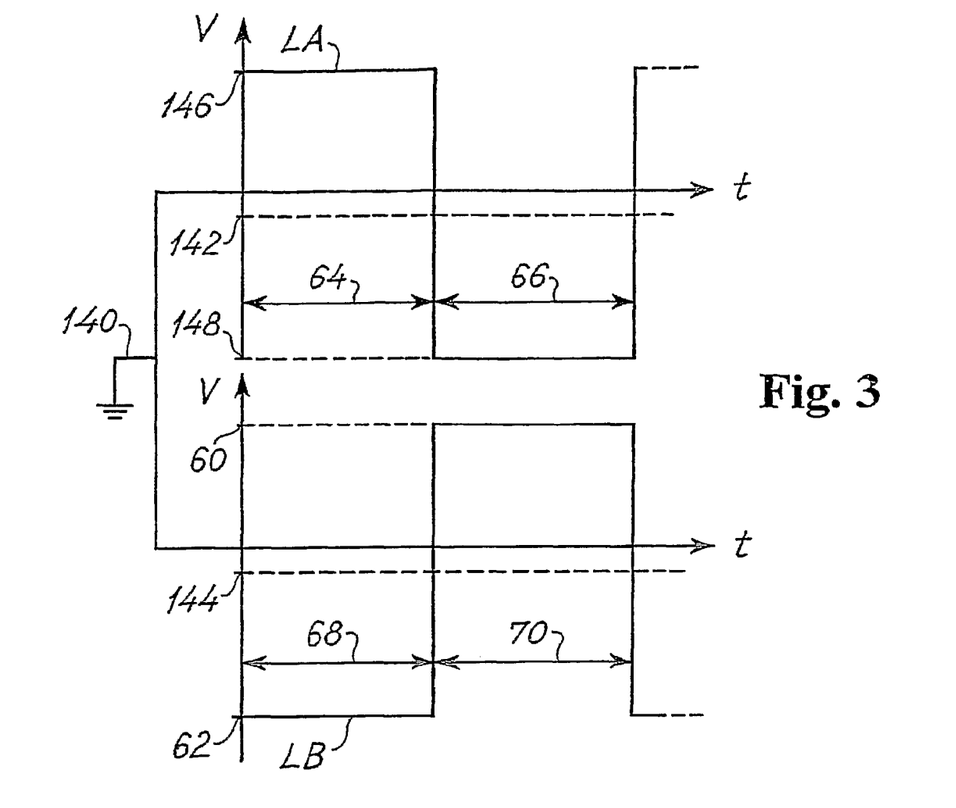
FIG. 3 shows alternating DC voltage signals versus time provided from a controller and power supply unit on the two-wire cable to at least one of the localised irrigation control units.

The line decoder 44 and the sensor decoder 52 receive power through the two-wire cable 28 from the controller and power supply unit 30. FIG. 3 shows voltage versus time curves of a first alternating DC (or "square wave") voltage signal, designated by LA, and a second alternating DC (or "square wave") voltage signal, designated by LB, simultaneously provided by the controller and power supply unit 30 to the two-wire cable 28 for powering of the line decoder 44 and the sensor decoder 52.

The first alternating DC voltage signal LA has a positive pulse with a pulse width 64 in the range 450 ms to 550 ms and a negative pulse with a pulse width 66 in the range 450 ms to 550 ms. In the presently preferred embodiment of the invention the pulse width 64 is substantially equal to 500 ms, and the pulse width 64 and the pulse width 66 are substantially equal.

The first alternating DC voltage signal LA has a maximum voltage 146 in the range of +10V to +20V and has a minimum voltage 148 in the range of −5V to −25V. In the presently preferred embodiment of the invention the maximum voltage 146 is +15V and the minimum voltage 148 is equal to −20V.

The first alternating DC voltage signal LA is symmetrical about a line 142 indicating a negative off set voltage of the first alternating DC voltage signal LA, in the presently preferred embodiment of the invention the off set voltage is approximately −2V.

The second alternating DC voltage signal LB is inverted in comparison with the first alternating DC voltage signal LA and has a negative pulse with a pulse width 68 in the range 450 ms to 550 ms and a positive pulse with a pulse width 70 in the range 450 ms to 550 ms. In the presently preferred embodiment of the present invention the pulse width 68 is substantially equal to 500 ms and the pulse width 64, the pulse width 661, the pulse width 68 and the pulse width 70 are substantially equal.

The term inverted in this context means a phase shift between the first alternating DC voltage signal LA and the second alternating DC voltage sign al LB of approximately 180°.

The second alternating DC voltage signal LA has a maximum voltage 60 in the range of +10V to +20V and has a minimum voltage 62 in the range −15V to −25V. In the presently preferred embodiment of the invention the maximum voltage 60 is equal to the maximum voltage 146 of the first alternating DC voltage signal LA, and the minimum voltage 62 is equal to the minimum voltage 148 of the first alternating DC voltage signal LA.

The second alternating DC voltage signal LB is symmetrical about a line 144, which line 144 indicates a negative off set voltage of the second alternating DC voltage signal LB. In the presently preferred embodiment of the invention the off set voltage of the second alternating DC voltage signal is approximately equal to the off set voltage of the first alternating DC voltage signal.

By off setting the first and the second alternating DC voltage signals LA, LB with a negative voltage relative to ground 140 a substantially slower corrosion of the two-wire cable 28 is achieved. In case of negative off set, the current will run from the ground level 140 to copper material of the two-wire cable 28 resulting in an alkaline process, which is less hazardous to the copper material than an electron acceptor donating process relative to ground level 140, achieved in case of positive off set forcing the current to run from the copper material to the ground level 140.

Figure 4:
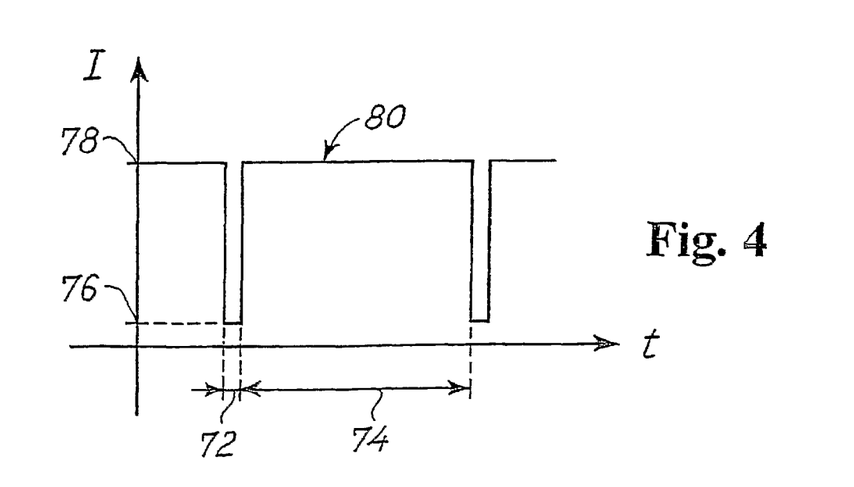
FIG. 4 shows alternating DC current signal versus time applied by the controller and power supply unit on to the two-wire cable and received by at least one of the localised irrigation control units.

FIG. 4 shows a current versus time curve of an alternating DC ("square wave") current signal 80 provided by the controller and power supply unit 30 between the wires of the two-wire cable 28. The alternating DC current signal 80 has a maximum current 78 in the range of 0.5 A to 2 A, and has a minimum current 76 in the range of 20 mA to 150 mA. In the presently preferred embodiment of the invention the maximum current 78 is 1.1 A and the minimum current 76 is 40 mA.

The alternating DC current signal 80 furthermore has a first pulse width 72 defining the period of minimum current 76 of the alternating DC current signal 80, which pulse width 72 is in the range 0.1 ms to 10 ms, and has a second pulse width 74 defining the period of maximum current 78 of the alternating DC current signal 80. In the presently preferred embodiment of the invention, the first pulse width 72 is shorter than 5 ms and the second pulse width 74 is less than 500 ms. The length of the pulse width 74 depends on which operation is performed by the controller and power supply unit 30. In case of an Arbitration or data transferring transmission consisting of a series of binary "1"s then the second pulse width 74 is shorter than 20 ms. During normal operation the second pulse width 74 however, is shorter than 500 ms.

For the following discussion the closed position of the valve is taken to mean the first position, and the open position is taken to mean the second position. However, these positions may be interchanged, i.e. the open position of the valve may be the first position and consequently the closed position then is the second position.

FIG. 5 shows a voltage versus time curve of the control signal 100 provided by the line decoder 44 to the controllable irrigation valve 42. The control signal 100 consists of an inrush signal 102 and a hold signal 104. The inrush signal 102 provides a maximum voltage 82 for operating the controllable irrigation valve 42 in an open position enabling water to flow from the water pipeline 16 to the local pipeline 22 positioned in the localised areas 20. The inrush signal 102 defines a pulse width 88 in the range 10 ms to 1 s. In the presently preferred embodiment of the invention the pulse width 88 is in the range 30 ms to 100 ms. When the controllable irrigation valve 42 is completely opened the line decoder 44 changes the control signal 100 from the inrush signal 102 to the hold signal 104. The hold signal 104 has a reduced maximum voltage 84. The line decoder 44 continues to transmit the hold signal 104 as long as dictated by the schedules of instructions. As soon as the control signal is turned off 106 providing round voltage 86 to the controllable irrigation valve 42 the controllable irrigation valve 42 closes and thereby disables the flow of water from the water pipeline 16 to the local pipeline 22.

In order to reduce power consumption of the controllable irrigation valves 42 the control signal 100 in the presently preferred embodiment of the invention is constructed from a series of square wave pulses 114 constituting a pulsed inrush signal 110 and constituting a pulsed hold signal 112. The square wave pulse series 114 defines a voltage maximum 92 having a pulse width 94 and defines a voltage minimum 90 having a pulse width 96 in the pulsed inrush signal 110, and defines the voltage maximum 92 having a pulse width 99 and defines the voltage minimum 90 having a pulse width 98 in the pulsed hold signal 112. According to a first embodiment of the present invention the pulse width 94 and the pulse width 96 and the pulse width 99 are 1 ms, but may be any value in the range 100 µs to 0.1 s. The pulse width 98 is 10 ms, but may be any value in the range 6 ms to 30 ms. The average voltage of the pulsed inrush signal 110 is equal to the maximum voltage 82 of the inrush signal 102 and the average voltage of the pulsed hold signal 112 is equal to the reduced maximum voltage 84 of the hold signal 104. According to a second and presently preferred embodiment of the invention and as shown in FIG. 5 the sum of the pulse widths 94 and 96 and the sum of the pulse widths 98 and 99 are 1 ms, but may be any value in the range 100 µs to 0.1 s. During the pulsed inrush signal 110 the pulse width 94 is substantially larger than the pulse width 96 thereby constituting an average voltage of the pulsed inrush signal 110 equal to the maximum voltage 82 of the inrush signal 102. During the pulsed hold signal 112 the pulse width 98 is substantially smaller than the pulse width 99 thereby constituting an average voltage of the pulsed hold signal 112 equal to the reduced maximum voltage 84 of the hold signal 104.

The maximum voltage 92 of the control signal 100 in the presently preferred embodiment of the invention is 35V, but may have any value in the range 5V to 45V. The minimum voltage 90 of the control signal 100 in the presently preferred embodiment of the invention is 0V equal to ground level 86, but may be in the range 0V to 5V.

In general, the valves are preferably electrically operated and opened by applying the inrush voltage or current signal followed by the hold voltage or current signal to the pair of valve control inputs and closed by applying no voltage or current signal to the pair of valve control inputs. Further the line decoders or any other suitable electronic controller (PLC, computer, sub-module, etc) could provide the inrush voltage, the hold voltage and the zero voltage to the valves by supplying from the pair of valve control outputs a pulsed alternating DC control signal to the pair of valve control inputs. Alternatively and even in addition to the above pulsed signals, the line decoders or the any other suitable electronic controller provide the inrush voltage, the hold voltage and the zero voltage to the valves by supplying from the pair of valve control outputs a suitable steady constant DC control signal—free from any pulsation in the two distinct levels, i.e. during inrush and hold, respectively, i.e. as the inrush voltage or current signal followed by the hold voltage—to the pair of valve control inputs.

The line decoder included in the localised irrigation control comprises a control and power supply input section having a pair of control and power supply inputs connected to the two-wire cable interconnecting the line decoder and the controller and power supply unit, a valve control power output stage having at least one pair of valve control outputs connected to a pair of valve control inputs of a specific controllable irrigation valve, and a second microprocessor unit interconnecting the control and power supply input section and the valve control output.

By implementing the communication from the irrigation control units as described above a series of advantages are achieved. The two-wire irrigation controlling and monitoring system consumes little power during normal operation and during transmission of information between the controller and power supply unit and the irrigation control units and when the latter. e.g. the controller unit controls the core of a valve, which core in turn controls the piston of the valve.

The term controllable irrigation valve so far discussed is to be understood as a valve in general.

The line decoder so far discussed is to be understood as a Programmable Logic Controller with or without sub-modules, a personal computer, a personal computer applied in any industrial application or any other electronic device able to control the valve nearby or in a application more physically remote to the valve. For the following discussion, the unit controlling the valve is denoted "controller unit".

The system as referred to in following comprises valves and controller units connected to the valves.

In the following methods and systems are discussed, which methods and systems optimise the current and the voltages applied to the solenoids in order to obtain an optimised, i.e. minimized power consumption in the solenoids of the mentioned valves.

Solenoid Power Control

As discussed in relation to FIG. 5, the activation of the solenoid for the controllable valve or valves has two phases "inrush" and "hold" to force and retain, respectively the core controlling a piston of the valve in the open position. In order to get the core of the valve into the open position, the valve is controlled through these two phases, namely, first "inrush" and then "hold". The phase of "inrush" has the higher DC voltage to actually move the core from the closed to the open position, whereas the "hold" phase only requires a low voltage to maintain or retain the core of the valve in the open position. If the hold voltage is too low—to retain or maintain the core of the valve in the open position—the core moves back to the closed position, which movement is not desired.

This piston of the valve follows the core of the valve.

In general when referring to voltages in the following, these may be implemented as constant steady DC voltage (which is the general understanding of a DC voltage) or of a DC voltage obtained by means of pulses. E.g. for the latter a 5 V DC "effective" voltage may be implemented by means of 10 V DC voltage having a duty cycle of its pulses of 50%. For a higher voltage to be obtained the duty cycle is increased, and conversely to obtain a lower "effective" DC voltage the duty cycle accordingly is to be decreased.

When DC voltage level signals are discussed, that also means currents resulting in the voltage level.

An object of the invention is to optimise the voltage level for the hold voltage (i.e. possibly to a lower value) whereby a system with many valves is able to have a large capacity (and being larger as compared to a non-optimises system having the same power supply power) with respect to the number of active controllable valves due to the lower and optimised value for the hold voltage of the valve. In particular, since the hold voltage of the valve could be found for each valve—and necessarily not the same value for all valves—the system is power optimised when many valves simultaneously or one at a time are in the "hold" phase. The same also applies for the inrush voltage, where applicable.

Such optimisation is however not simple and may be difficult to perform for a technically non-skilled person. Because of the very high number of controllable valves/solenoid types available on the marked it is not realistic to make individual manual setups, e.g. to be put in a table having parameters of the valves. This calls for an automated setup to find the parameters, e.g. the resistance and the inductance of the solenoid of the valve, and the required necessary high enough—but not too high to avoid consuming too much power—voltage or current to retain each valve individually in the "hold" phase.

Further the manual finding out and the subsequent distribution of information regarding such parameters—and the maintenance of them—would be very time consuming and expensive as well. This also calls for an automated setup of each valve to find the parameters belonging to the valve.

Further, even though such parameters were initially known, e.g. from the purchase of valves and solenoids (as an initial technical specification from the technical sheet supplied with the valve), it happens anyway that such parameters change over time, and thus the initial technical specification—e.g. self-inductance and resistance as some of the parameters, if initially available—would not apply anyway.

This also calls for an automated setup—and from time to time for a repeated setup—of each valve in order, currently, to obtain and subsequently apply the parameters belonging to the valve during its operation. E.g. a value related to the parameters of the valve is the voltage needed to retain the piston or core of the valve—after inrush—in the open stage or position.

Further, especially when the valves are worn or subjected to stress etc. it cannot be expected that their parameters—or required voltage/per movable position—are the same. This, of course, again calls for an automated setup of each valve.

In the following two methods/systems will be described.

Optimal Optimisation Method/System

Method one may optimise optimal, but the method requires run-in after installation of a system of valves and controller units. This may be done automatically.

The other method—Constant Power Method—utilises the fact that in some systems it may be allowed for each controllable valve/solenoid to use more energy than optimal, but that the maximum energy consumption of the whole system must be under control and controlled.

Optimal Optimisation Method/System

This method utilises the fact that it is possible to measure the position of the core in the solenoid. In practice this means determining whether the core physically is in a completely "Open" or completely "Closed" position.

Principles of the Optimal optimisation method, which executes the following steps:

1) Before activation, i.e. before controlling the core to move in the open position, i.e. when the core is in "Closed" position, apply the same voltage Vh to the solenoid as calculated during the previous Deactivation (see below). The inductance of the solenoid is measured in the "Closed" position.

2) The solenoid is now activated through the Inrush phase to the Hold phase. In the Hold phase the voltage Vh is applied, i.e. inrush DC voltage level signal. The valve is now expected to be—and retained—in the "open" position.

3) In the Hold phase the inductance is measured again. If the core actually is in the "open" position the inductance will be a minimum of 10% higher than the inductance in the "Closed" position.

4) The inductance is measured continuously in the Hold phase to register that no situation of the core moving to the closed position unwantedly takes place due to a too low Vh value of the holding voltage. In case the Vh value—i.e. the hold DC voltage level signal—applied to the solenoid is too low, the core moves—typically due to a spring loaded piston of the cylinder—to the closed position (of the cylinder or core) instead of staying in the open position (of the cylinder or core).

5) Every time after a Deactivation, i.e. after the core has been in the closed state—as discussed under 1) and in a new activated state, i.e. in the open position and after the "Inrush phase" i.e. in the "hold phase", the voltage of Vh is reduced over a period of time and the inductance is measured simultaneously. When the transition from "Open" to "Close" position is registered a new Vh, which is used for the next activation, is calculated on the basis of the actual Vh. An appropriate margin is added to Vh to—in the calculation—ensure the voltage is high enough to retain the core in the "hold phase" and that the core actually and physically will be retained in the open position.

If the controller unit applies a too low Vh it has the consequence that the core leaves the "hold" phase and enters a closed position. This is detected—in the "Closed" position—in that the inductance there computed will be low, since the inductance in the "Open" position is a minimum of 10% higher than the inductance in the "Closed" position. In that case the controller unit will apply a higher Vh to obtain that the core stays in the "hold" phase in the open position.

The applicant has by experiments the experience that the inductance of the coil of the valve applied in the "Open" position is a minimum of 10% higher than the inductance in the "Closed" position. The reason is that the core and the metallic parts of the valve in these two different positions differently affect the windings of the coil and thus the respective inductance values of the coil in the "Closed" and "Open" positions of the valve.

In new installations of a system or when changing the controller unit/controllable valve or valve it will be necessary to accept that the valve either:

has to go through the steps above to find the proper Vh or uses a lot of power at the first activation to ensure a safe hold signal Vh is achieved or that the core of the valve during the first couple of times malt not make it to a connect and retained "Open" position until a correct Vh—and sufficiently high Vh—is found and applied.

The solenoid is not just re-activated through "InLrush" if the "Open" condition fails, since the high "Inrush" voltage will effect the rest of the system (e.g. a common power line connecting several controller units with corresponding valves) in a powerful manner, which often is undesired.

The system/method may be fine tuned by instead of regulating the voltage—Vh—to the solenoid (as above), i.e. the current is regulated because the magnetic force on the core is proportional to the current flowing through the solenoid. Hereby the temperature dependency of the solenoid copper's resistance, Rcu, may eliminated.

The inductance is measured by measuring DIs/DT (the change in the current per time unit) in the solenoid during switching conditions (before/after Inrush but with Hold Vh value) the status of the core/piston, i.e. the physical position of the piston and core (open or closed) may then be directly be determined from such measurements.

Constant Power Method/System

In smaller irrigation systems or in other industrial applications such as in a power plant, on a ship, in a manufacturing plant, etc in which valves are applied to control fluids such as a water, oil or air the need for many simultaneously active solenoid/valves some time is limited to e.g. only 3-5 units in small isolated areas as compared to 20-40 units in larger systems.

In such areas in such small systems applying the method there will—as compared to larger systems—be a relative energy or power surplus, which may in such small system/method be "squandered" on active solenoids so that, in the Hold position/condition, they are being driven with a much higher safety margin. i.e. with a higher Vh than actually needed to retain the core.

Principle:

1. The solenoid is fed with a known constant energy (power) in the Hold position independent of the actual resistance, Rcu, in the solenoid. The added energy (level) is so high that it is expected to be able to retain the majority of the Solenoid/Valves in the "Open" position. In other words the Vh hold voltage is set to such a high level—still lower than the Inrush voltage level—that this level by past experience will be able to retain the core/piston in the open position.

2. Because of e.g. a Buck switch mode regulating principle of the power supply a known constant energy will be drawn out of the electric supply mains for each active solenoid (a bit higher than supplied to the solenoid due to losses in the regulating circuit, e.g. diodes, transistors, etc). The power supplied is independent of the solenoid's actual resistance. Rcu.

3. Since the energy that is consumed by the system or by applying the method is known, the capacity of the system with respect to the number of active controller units and valves etc may be calculated in before.

As the effectiveness of the e.g. Buck switch regulator to a small degree is dependent on input and output voltage, it may alternatively be regulated so that power consumption from the system is constant instead.

The energy to the solenoid is determined by one of two methods:

1) During Inrush the switch duty cycle is set to 100%. By measuring the current, I to the solenoid and the voltage over it, U, the resistance. Rcu of the solenoid is calculated according to Rcu=U/I. Because the duty cycle is 100% or since a constant steady DC voltage is applied, these measurements of U and I and their ratio—Rcu—are easy to perform.

Afterwards in the Hold position the duty cycle is adjusted down or the constant steady DC voltage is lowered so that the voltage Vs to the solenoid gives the exact desired power input Ps=Vs*Vs/Rcu. The advantage of this is a very simple implementation.

In the cases of Inrush and Hold, it may be the case that the desired power consumption (U×U/Rcu) for each of these cases is predetermined and accordingly and subsequently due to the knowledge of Rcu the corresponding Voltages for Inrush and Hold, respectively may be computed.

Alternatively, the power to be supplied to the solenoid of the valve is determined by:

2) During the Hold phase (with Vh applied) the solenoid current (Is) is measured continuously. From the momentary internal voltage supply the Vin and the duty cycle of Vin (Vh) the input power to the solenoid is calculated as Ps=Vin*DutyCycle*Is. The advantage of this solution is that it adapts dynamically to the solenoid and it demands less than 100% duty cycle of the voltage supplied during Inrush or a lower constant steady DC voltage need only be supplied to the coil.

Since the current flowing in the coil in this case has the pulse form of a saw-tooth, the measuring of this is less simple than described under method 1).

In general, the inductance may be measured during the transition from one DC voltage to another higher or lower DC voltage (e.g. during transitions between In-Rush and Hold, etc). In case a pulsed alternating DC ("square wave") control signal is applied, the inductance may be measured during the transitions of such pulses in the closed or open positions (Inrush, Hold) of the core. Other measurements known in the art to determine the inductance could be applied as well.

Physical Implementation

Figure 6:
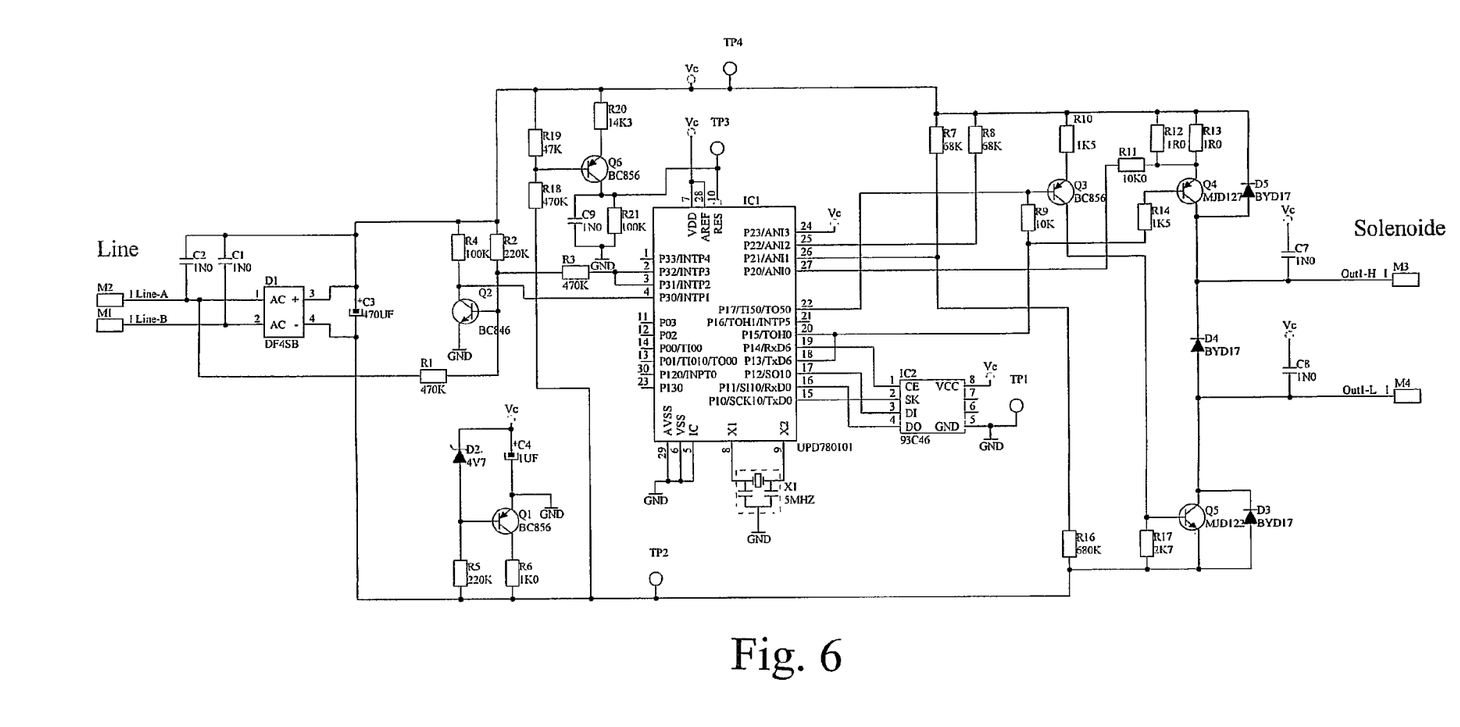
FIG. 6 is a diagram implementing the invention

Enclosed is a diagram in FIG. 6 implementing the invention. In this it is possible to measure the internal voltage supply Vin by means of R7, R16. The solenoid current—denoted Is—measured as voltage drop over the resistors R12. R13. Accordingly the current may be computed by dividing the voltage measured with the resistor value. The diagram may e.g. be implemented in the controller unit controlling the voltages, current and the duty cycle of the power to the valve.

The applicant has implemented the diagram by the use of the following components:

| Used | Part Type | Designator |
|---|---|---|
| Resistors | | |
| 1 | 10K0 | R11 |
| 2 | 1K5 | R10 R14 |
| 2 | 1R0 | R12 R13 |
| 2 | 100K | R21 R4 |
| 1 | 10K | R9 |
| 1 | 14K3 | R20 |
| 1 | 1K0 | R6 |
| 2 | 220K | R2 R5 |
| 1 | 2K7 | R17 |
| 3 | 470K | R1 R18 R3 |
| 1 | 47K | R19 |
| 2 | 680K | R15 R16 |
| 2 | 68K | R7 R8 |
| Capacitors | | |
| 5 | 1N0 | C1 C2 C7 C8 C9 |
| 1 | 1UF | C4 |
| 1 | 470UF | C3 |
| Diodes | | |
| 1 | 4V7 | D2 |
| 3 | BYD17 | D3 D4 D5 |
| 1 | DF4SB | D1 |
| Transistors | | |
| 1 | BC846 | Q2 |
| 3 | BC856 | Q1 Q3 Q6 |
| 1 | MJD122 | Q5 |
| 1 | MJD127 | Q4 |
| Integrated Circuits | | |
| 1 | 93C46 | IC2 |
| | UPD780101 | IC1 |
| Crystals | | |
| 1 | 5 MHZ | X1 |

Figure 7:
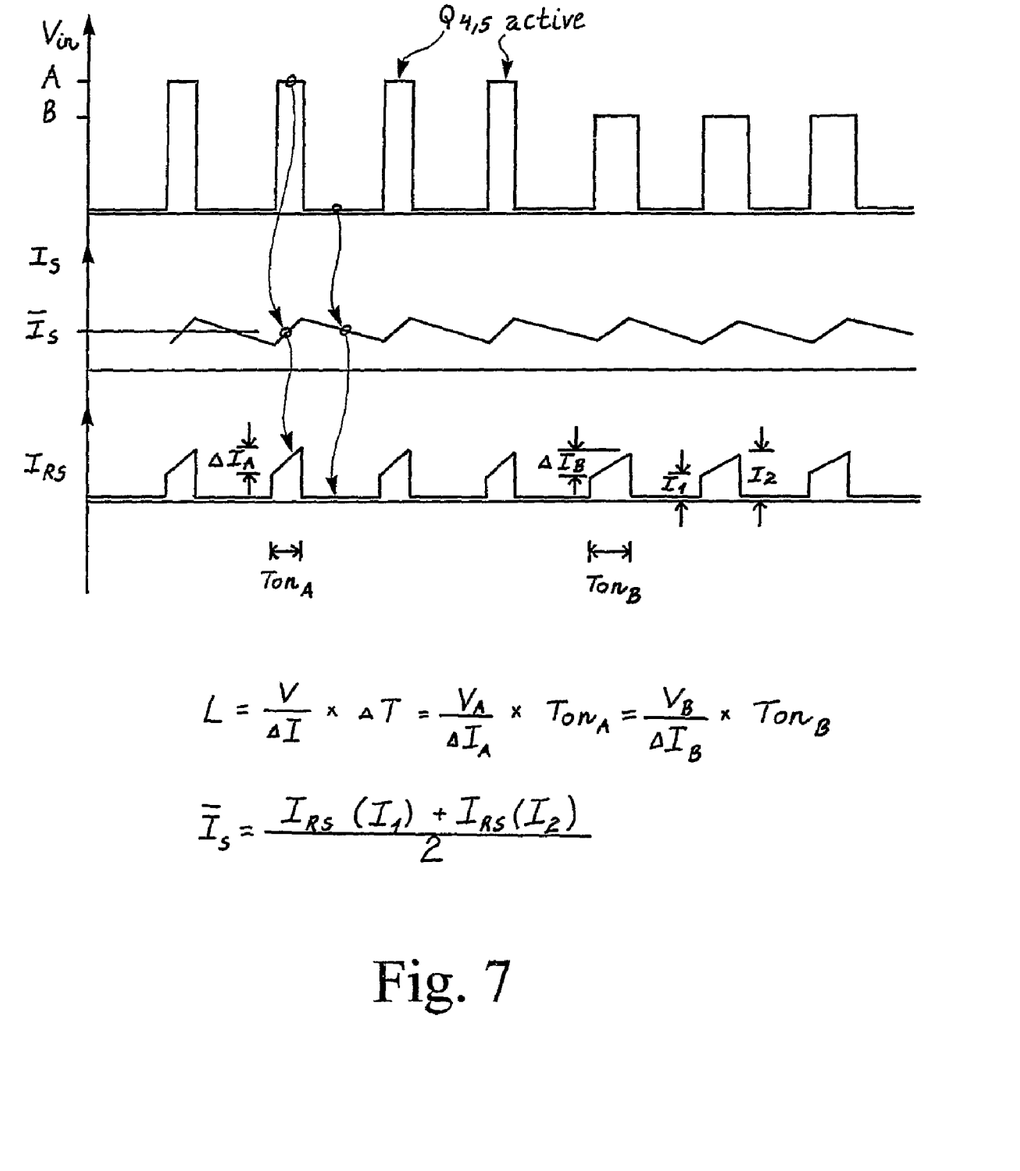
FIG. 7 is a figure showing how the measurement of the inductance according to the invention is implemented.

Enclosed is a drawing in FIG. 7 implementing an embodiment of measurement of the inductance according to the invention.

The curves show typical currents and/or voltage conditions when powering the solenoid. Vin is shown having two values, high as A and low as B. At A the duty cycle is low (small Ton time). There is a Longer Ton time at the lower voltage B. The current through the solenoid is a DC current to which a saw-tooth voltage from the switching process in the power supply is added. The current to and through the solenoid is measured as a voltage drop over Rs (R12, 13). Since the current only flows when the regulator switches Q4, 5 are active the curves are as shown.

It can be seen from the curves for Irs along with the measuring of Vin that the parameters of the solenoid may be determined, that is the inductance may be calculated and the mean current Is may be calculated.

In the spirit of the invention the closed and the open position may be reversed, i.e. the inrush and hold voltage then, in that case, are applied to moving and retaining, respectively the core to and in the closed position. Accordingly, the optimisations then are power, energy and voltages/currents applied to the closed position.

It is further in the spirit of the invention to apply the determination of whether the core—and the piston accordingly—of the valve actually physically moved into the first or the second position, which may be the open and closed end-positions, respectively or which may be closed and opened end-positions, respectively. Hereby, it is possible in an industrial application to avoid the use of a pair of reed-relays, a pair of photocells or another pair of proximity sensors, e.g. inductive or capacitive to detect the two end-positions. It is thus possible to integrate the solution in the same module which controls the valve, i.e. the module then by measurements of voltages and currents—which is across and flow to and through the two wires of the solenoid—will be able to detect when and whether the coil, when powered, actually made the piston along with the coil move to one of the two mentioned positions or end-positions.

Accordingly, reed-relays, photocells or inductive or capacitive proximity sensors are not needed in a pair to detect the two end-positions.

The invention claimed is:

1. A system for optimizing power to a movable core within a valve, said system comprising:
    a controller unit having a pair of valve control outputs for providing a valve control signal; and
    a valve comprising a pair of valve control inputs, a solenoid, and a core operable between a first position and a second position;
    wherein said pair of valve control inputs is connected to said solenoid and to said pair of valve control outputs;
    wherein said controller unit defines an inrush DC voltage level signal for forcing said core into said second position and a hold DC voltage level signal for retaining said core in said second position and a zero voltage signal for moving said core to said first position; wherein
    said controller unit, in said first position of said core, provides said valve control signal with said hold DC voltage level, measures a first self inductance representing said core in said first position, and provides said valve control signal with said inrush DC voltage level signal for forcing said core from said first position to said second position;
    wherein said controller unit subsequently provides said valve control signal with said hold DC voltage level for retaining said core in said second position;
    wherein said controller unit measures, in said second position of said core, a second self inductance representing said core in said second position;
    wherein said controller unit, in said second position of said core, while providing said valve control signal with said hold DC voltage level, gradually decreases said hold DC voltage level and measures a third self inductance representing the actual physical position of said core;
    wherein said controller unit determines, on the basis of one of said first and second self inductances in comparison with said third self inductance, whether said core is in said first or second position;
    wherein, on the basis of said comparison, said controller unit applies said gradually decreased hold DC voltage level for retaining said core in said second position if said core is in said second position; and
    wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 µs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range 10 ms to 1 s, and constitutes said DC hold voltage level by having said first part shorter than said second part.

2. The system of claim 1, wherein said valve is operable by a mechanism selected from a group consisting of at least one of magnetic, electric, hydraulic, and pneumatic.

3. The system of claim 1, wherein said core of said valve is moved to said second position by applying said inrush DC voltage level signal followed by said hold DC voltage level to said pair of valve control inputs, and said core of said valve is moved to said first position by applying said zero voltage signal to said pair of valve control inputs.

4. The system of claim 1, comprising between 20 and 40 valves and between 20 and 40 controller units.

5. The system of claim 1, wherein said system is an irrigation system.

6. A system for providing power to a movable core within a valve to secure a position of said core in the valve, said system comprising:
    a controller unit having a pair of valve control outputs for providing a valve control signal; and
    a valve comprising a pair of valve control inputs, a solenoid, and a core operable between a first position and a second position;
    wherein said pair of valve control inputs is connected to said solenoid and to said pair of valve control outputs;
    wherein said controller unit defines an inrush DC voltage level signal for forcing said core into said second position and a hold DC voltage level signal with a sufficiently high voltage level margin to securely retain said core in said second position;
    wherein said controller unit is operable to move the core of said valve into said second position by applying said inrush DC voltage level signal followed by said hold DC voltage level signal with said voltage level margin to said pair of valve control inputs, and said controller unit moving said core of said valve to said first position by applying substantially a zero voltage signal to said pair of valve control inputs; and
    wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 μs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range of 10 ms to 1 s, and constitutes said DC hold voltage level by having said first part shorter than said second part.

7. The system of claim 6, said valve is operable by a mechanism selected from a group consisting of at least one of magnetic, electrical, hydraulic, and pneumatic.

8. The system of claim 6, wherein said system comprises between 2 and 19 valves and between 2 and 19 controller units.

9. The system of claim 8, wherein said system comprises between 3 and 5 valves and between 3 and 5 controller units.

10. The system of claim 6, wherein said system is an irrigation system.

11. A system for providing power to a core of a valve to secure a position of said valve with use of a constant energy, said system comprising:
   a controller unit having a pair of valve control outputs for providing a valve control signal; and
   a valve comprising a pair of valve control inputs, a solenoid, and a core operable between a first and a second position;
   wherein said pair of valve control inputs is connected to said solenoid and to said pair of valve control outputs;
   wherein said controller unit defines an inrush DC voltage level signal for forcing said core in said second position and a hold DC voltage level signal for securely retaining said core in said second position;
   wherein said controller unit defines a resistance for said solenoid and a constant energy level for said hold DC voltage level signal, said constant energy level defined independently of said resistance for said solenoid;
   wherein said controller unit moves said core of said valve into said second position by applying said inrush DC voltage level signal followed by said hold DC voltage level signal adjusted to match said constant energy level to said pair of valve control inputs, and moves said core of said valve into said first position by applying substantially a zero voltage signal to said pair of valve control inputs; and
   wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 μs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range of 10 ms to 1 s, and constitutes said DC hold voltage level by having said first part shorter than said second part.

12. The system of claim 11, wherein said valve is operable by a mechanism selected from a group consisting of at least one of magnetic, electric, hydraulic, and pneumatic.

13. The system of claim 11, wherein said system comprises between 2 and 19 valves and between 2 and 19 controller units.

14. The system of claim 13, wherein said system comprises between 3 and 5 valves and between 3 and 5 controller units.

15. The system of claim 11, wherein said system is an irrigation system.

16. A method for optimizing power to a movable core within a valve, said comprising the steps of:
   providing a valve control signal from a controller unit having a pair of valve control outputs;
   providing a valve comprising a pair of valve control inputs, a solenoid, and a core operable between a first and a second position within the valve;
   connecting said pair of valve control inputs to said solenoid and to said pair of valve control outputs;
   defining by said controller unit an inrush DC voltage level signal for forcing said core in said second position;
   defining by said controller unit a hold DC voltage level signal for retaining said core in said second position;
   defining by said controller unit a zero voltage signal for moving said core to said first position; providing by said controller unit, in said first position of said core, said valve control signal with said hold DC voltage level and measuring a first self inductance representing said core in said first position;
   providing by said controller unit, in said first position of said core, said valve control signal with said inrush DC voltage level signal for forcing said core from said first position to said second position, and subsequently providing by said controller unit said valve control signal with said hold DC voltage level for retaining said core in said second position and measuring by said controller unit, in said second position of said core, a second self inductance representing said core in said second position;
   while providing by said controller unit, in said second position of said core, said valve control signal with said hold DC voltage level, gradually decreasing by said controller unit said hold DC voltage level and measuring by said controller unit a third self inductance representing the actual physical position of said core;
   determining by said controller unit, on the basis of one of said first and second self inductances in comparison with said third self inductance, whether said core is in said first or second position;
   applying, on the basis of said comparison, said gradually decreased hold DC voltage level by said controller unit for retaining said core in said second position provided said core is in said second position; and
   wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 μs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range of 10 ms to 1 s, and constitutes said DC hold voltage level by having said first part shorter than said second part.

17. The method of claim 16, wherein said valve is operable by a mechanism selected from a group consisting of at least one of magnetic, electric, hydraulic, and pneumatic.

18. The method of claim 16, wherein said core of said valve is moved to said second position by applying said inrush DC voltage level signal followed by said hold DC voltage level to said pair of valve control inputs, and wherein said core of said valve is moved to said first position applying said zero voltage signal to said pair of valve control inputs.

19. The method of claim 16, wherein said method is implemented in an irrigation system.

20. A method for providing power to a core of a valve to secure a position of said valve, said method comprising the steps of:
providing a valve control signal from a controller unit having a pair of valve control outputs;
providing a valve comprising a pair of valve control inputs, a solenoid, and a core operable between a first and a second position;
connecting said pair of valve control inputs to said solenoid and to said pair of valve control outputs;
defining by said controller unit an inrush DC voltage level signal for forcing said core in said second position;
defining by said controller unit a hold DC voltage level signal with a sufficiently high voltage level margin to securely retaining said core in said second position;
moving said core of said valve into said second position by said controller unit by applying said inrush DC voltage level signal followed by said hold DC voltage level signal with said voltage level margin to said pair of valve control inputs, and moving said core of said valve into said first position by said controller unit by applying substantially a zero voltage signal to said pair of valve control inputs; and
wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 µs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range 10 ms to 1 s, and constitutes said DC hold voltage level by having said first part shorter than said second part.

21. The method of claim 20, wherein said valve is operable by a mechanism selected from a group consisting of at least one of magnetic, electric, hydraulic, and pneumatic.

22. The method of claim 20, said method is implemented in an irrigation system.

23. A method for providing power to a core movable within a valve to secure a position of said valve with use of a constant energy, said method comprising the steps of:
providing a valve control signal from a controller unit having a pair of valve control outputs;
providing a valve comprising a pair of valve control inputs, a solenoid, and a core operable between a first and second position;
connecting said pair of valve control inputs to said solenoid and to said pair of valve control outputs;
defining by said controller unit an inrush DC voltage level signal for forcing said core in said second position;
defining by said controller unit a hold DC voltage level signal for securely retaining said core in said second position;
defining by said controller unit a resistance for said solenoid;
defining by said controller unit a constant energy level for said hold DC voltage level signal, said constant energy level being defined independently of said resistance for said solenoid;
adjusting by said controller unit said hold DC voltage level signal to match said constant energy level;
moving said core of said valve into said second position by said controller unit said valve by applying said inrush DC voltage level signal followed by said adjusted hold DC voltage level signal to said pair of valve control inputs, and moving said core of said valve into said first position by said controller unit by applying a substantially zero voltage signal to said pair of valve control inputs; and
wherein said controller unit provides said inrush DC voltage level signal, said adjusted hold DC voltage level and said substantially zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 µs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range 10 ms to 1 s, and constitutes said DC hold voltage level by having said first part shorter than said second part.

24. The method of claim 23, wherein said valve is operable by a mechanism selected from a group consisting of at least one of magnetic, electric, hydraulic, and pneumatic.

25. The method of claim 23, wherein said method is implemented in an irrigation system.

26. A system for optimizing power to a movable core within a valve, said system comprising:
a controller unit having a pair of valve control outputs for providing a valve control signal; and
a valve comprising a pair of valve control inputs, a solenoid, and a core operable between a first position and a second position;
wherein said pair of valve control inputs is connected to said solenoid and to said pair of valve control outputs;
wherein said controller unit defines an inrush DC voltage level signal for forcing said core into said second position and a hold DC voltage level signal for retaining said core in said second position and a zero voltage signal for moving said core to said first position; wherein
said controller unit, in said first position of said core, provides said valve control signal with said hold DC voltage level, measures a first self inductance representing said core in said first position, and provides said valve control signal with said inrush DC voltage level signal for forcing said core from said first position to said second position;
wherein said controller unit subsequently provides said valve control signal with said hold DC voltage level for retaining said core in said second position;

wherein said controller unit measures, in said second position of said core, a second self inductance representing said core in said second position;

wherein said controller unit, in said second position of said core, while providing said valve control signal with said hold DC voltage level, gradually decreases said hold DC voltage level and measures a third self inductance representing the actual physical position of said core;

wherein said controller unit determines, on the basis of one of said first and second self inductances in comparison with said third self inductance, whether said core is in said first or second position;

wherein said controller unit increases said gradually decreased hold DC voltage level, provides said valve control signal with said inrush DC voltage level signal for forcing said core from said first position to said second position, and applies said increased gradually decreased hold DC voltage level for retaining said core in said second position if said core is in said first position; and wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 μs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range 10 ms to 1 s, and constitutes said DC hold voltage level by having said first part shorter than said second part.

27. The system of claim 26. wherein said core of said valve is moved to said second position by applying said inrush DC voltage level signal followed by said hold DC voltage level to said pair of valve control inputs, and said core of said valve is moved to said first position by applying said zero voltage signal to said pair of valve control inputs.

28. A method for optimizing power to a movable core within a valve, said comprising the steps of:

providing a valve control signal from a controller unit ving a pair of valve control outputs;

providing a valve comprising a pair of valve control inputs, a solenoid, and a core operable between a first and a second position within the valve;

connecting said pair of valve control inputs to said solenoid and to said pair of valve control outputs;

defining by said controller unit an inrush DC voltage level signal for forcing said core in said second position;

defining by said controller unit a hold DC voltage level signal for retaining said core in said second position;

defining by said controller unit a zero voltage signal for moving said core to said first position; providing by said controller unit, in said first position of said core, said valve control signal with said hold DC voltage level and measuring a first self inductance representing said core in said first position;

providing by said controller unit, in said first position of said core, said valve control signal with said inrush DC voltage level signal for forcing said core from said first position to said second position, and subsequently providing by said controller unit said valve control signal with said hold DC voltage level for retaining said core in said second position and measuring by said controller unit, in said second position of said core, a second self inductance representing said core in said second position;

while providing by said controller unit, in said second position of said core, said valve control signal with said hold DC voltage level, gradually decreasing by said controller unit said hold DC voltage level and measuring by said controller unit a third self inductance representing the actual physical position of said core;

determining by said controller unit, on the basis of one of said first and second self inductances in comparison with said third self inductance, whether said core is in said first or second position;

increasing by said controller unit said gradually decreased hold DC voltage level, providing said valve control signal with said inrush DC voltage level signal for forcing said core from said first position to said second position, and applying by said controller unit said increased gradually decreased hold DC voltage level for retaining said core in said second position provided said core is in said first position; and wherein said controller unit provides said inrush DC voltage level signal, said hold DC voltage level and said zero voltage signal to said valve by supplying from said pair of valve control outputs a pulsed DC control signal to said pair of valve control inputs, said pulsed DC signal defining a maximum voltage in the range of 25V to 45V, a minimum voltage in the range of 0V to 5V, and a controller unit output pulse width in the range of 100 μs to 0.1 s, said controller unit output pulse width defining a first part having said maximum voltage and a second part having said minimum voltage, and wherein said pulsed DC signal constitutes said inrush DC voltage level signal by having said first part longer than or equal to said second part during a period in the range of 10 ms to 1 s, and constitutes said DC hold voltage level by having said first part shorter than said second part.

29. The method of claim 28, wherein said core of said valve is moved to said second position by applying said inrush DC voltage level signal followed by said hold DC voltage level to said pair of valve control inputs, and wherein said core of said valve is moved to said first position by applying said zero voltage signal to said pair of valve control inputs.

* * * * *